(12) United States Patent
Bello

(10) Patent No.: US 10,053,641 B2
(45) Date of Patent: Aug. 21, 2018

(54) HEAVY CRUDE OIL VISCOSITY REDUCER

(71) Applicant: Oil & Gas Tech Enterprises C.V., Noordwijk (NL)

(72) Inventor: Cridal Del Valle Sencial Bello, Edo Anzoategui (VE)

(73) Assignee: OIL & GAS TECH ENTERPRISES C.V., Noordwijk (NL)

( * ) Notice: Subject to any disclaimer, the term of this patent is extended or adjusted under 35 U.S.C. 154(b) by 87 days.

(21) Appl. No.: 15/245,819

(22) Filed: Aug. 24, 2016

(65) Prior Publication Data

US 2016/0362620 A1  Dec. 15, 2016

Related U.S. Application Data

(63) Continuation-in-part of application No. 14/509,696, filed on Oct. 8, 2014, now Pat. No. 9,453,157.

(51) Int. Cl.
| | |
|---|---|
| *C01G 99/00* | (2010.01) |
| *C10G 99/00* | (2006.01) |
| *C09K 8/58* | (2006.01) |
| *F17D 1/16* | (2006.01) |
| *C09K 8/524* | (2006.01) |

(52) U.S. Cl.
CPC .......... *C10G 99/00* (2013.01); *C09K 8/58* (2013.01); *F17D 1/16* (2013.01); *C09K 8/524* (2013.01); *C10G 2300/302* (2013.01); *C10G 2300/80* (2013.01)

(58) Field of Classification Search
None
See application file for complete search history.

(56) References Cited

U.S. PATENT DOCUMENTS

| | | | | |
|---|---|---|---|---|
| 2,799,646 | A | | 7/1957 | Lacey et al. |
| 4,737,295 | A | * | 4/1988 | Cowan ............ C08H 6/00 507/103 |
| 5,085,282 | A | * | 2/1992 | Hale ............... C09K 8/26 175/40 |
| 5,863,301 | A | * | 1/1999 | Grosso ........... C10L 1/328 137/13 |
| 2005/0194292 | A1 | | 9/2005 | Beetge et al. |
| 2005/0199395 | A1 | | 9/2005 | Berger et al. |
| 2014/0116690 | A1 | | 5/2014 | Bittner et al. |
| 2014/0238679 | A1 | | 8/2014 | Pope et al. |
| 2014/0273168 | A1 | * | 9/2014 | Dillon ............ C09K 8/035 435/255.1 |

(Continued)

OTHER PUBLICATIONS

Oil & Gas Tech Enterprises C.V. , Crude Oil Friction Reducer, U.S. Utility Application, U.S. Appl. No. 14/509,781, filed Oct. 8, 2014.

*Primary Examiner* — Jeffrey Washville
(74) *Attorney, Agent, or Firm* — Schmeiser, Olsen & Watts LLP

(57) ABSTRACT

A viscosity reducer based on vegetable extracts of natural origin is disclosed. The vegetable extracts include a mixture of phosphoglycerides and vegetable oils. A method of reducing the viscosity in heavy and extra heavy crude oil using the viscosity reducer is also disclosed. No aromatic base solvents are needed. A reduction in diluent usage is achieved using the viscosity reducer based on vegetable extracts. The viscosity reducer composition includes a mixture of phosphoglycerides, vegetable oil, non-aromatic solvent, polycyclic aromatic hydrocarbon and stabilizer.

8 Claims, 3 Drawing Sheets

(56) References Cited

U.S. PATENT DOCUMENTS

| | | |
|---|---|---|
| 2014/0353250 A1 | 12/2014 | Semple et al. |
| 2014/0371115 A1 | 12/2014 | Hill et al. |
| 2015/0011453 A1 | 1/2015 | Bennett et al. |
| 2015/0014221 A1 | 1/2015 | Yoon |

* cited by examiner

HEAVY CRUDE OIL VISCOSITY REDUCER

CROSS REFERENCE TO RELATED APPLICATION[S]

This application is a continuation-in-part of earlier U.S. Utility patent application entitled "Heavy Crude Oil Viscosity Reducer," Ser. No. 14/509,696, filed Oct. 8, 2014, the disclosure of which is hereby incorporated entirely herein by reference.

BACKGROUND OF THE INVENTION

Technical Field

This invention relates to a viscosity reducer and a method for manufacturing and using a viscosity reducer with active components based on vegetable extracts, to reduce the viscosity of heavy and extra-heavy crude oil, as well as reducing the consumption of diluents used in crude oil production systems.

State of the Art

Advances in exploration and production technologies in the petroleum industry are creating new major sources in areas that were previously off limits, for reasons of geography, politics and technology. Particularly, extra heavy crude oil has taken an increasingly important position in the oil market, due to the declination of traditional fields.

Some 80% of all heavy oils are extra heavy. These include oil sands, which are highly complicated as well as costly to develop. Although heavy oil is found in all parts of the world (e.g., Russia, USA, Middle East, Africa, Cuba, Mexico, China, Brazil, Madagascar, Europe and Indonesia), the largest accumulations are located in Venezuela (the Orinoco Belt) and Canada (the Province of Alberta). Combined, these two regions represent nearly 3,000 billion barrels of oil-in-place. They also account for 95% of global production of heavy oils (2.2 million barrels per day in 2008, two-thirds of which are in Canada and one-third in Venezuela). Less than 1% of these resources are in use or under active development today, and output should nearly quadruple, reaching at least 7 or 8 million barrels per day (Mb/d) by 2030. With such increases of heavy crude oil sources, now is a good time to exploit new avenues of research into the reduction of their viscosities.

Viscosity is the measure of resistance of a fluid to shear or tensile stress. In other words, the lower the viscosity of a fluid, the easier it is to move it. For example, low viscosity oil is much easier to move through a pipeline. Another way to comprehend the viscosity concept is to think of it as the internal resistance within a liquid to movement, akin to a fluid friction. Nearly all liquids have some resistance to movement and the branch of science studying this phenomenon is called rheology.

Crude oil or petroleum is a naturally occurring, toxic, flammable liquid consisting of a complex mixture of hydrocarbons of various molecular weights, and other organic compounds, that are found in geologic formations beneath the Earth's surface. The generally accepted theory of crude oil and natural gas formation is that over geological time periods, ancient biomass (kerogen) is heated and pressurized underground, finally converting to various grades and degrees of usable hydrocarbons.

Viscosity in crude oils is a direct function of the overall constituent hydrocarbons and can range from 200 centipoise (cP) for light crude oil to over 500,000 cP for bitumen. This large variability results in continuous development efforts by major oil and gas firms in enhanced oil recovery methods. A persistent problem in the thermal recovery of bitumen or very heavy oil is the very low mobility at the reservoir conditions. Despite improvements on thermal recovery methods such as Steam Assisted Gravity Drainage (SAGD) and Toe to Heel Air Injection (THAI), transportation of bituminous crude is highly problematic.

In order for these crude oils to be transported via pipeline from the source, typically the crude oils are blended with different types of diluents, such as kerosene, diesel, aromatic solvents, light oil, naphtha, and gasoline. This process has its disadvantages. Generally, up to 25% to 65% of diluent must be added to the blend for sufficiently reducing the viscosity, which uses up a great quantity of a valuable commercial product. Also, the added diluent must be processed again through the refinery along with the heavy crude oil, and usually some volume must be returned to upstream facilities to be used over and over.

Any viscosity reduction mechanism that does not need $C^{+4}$ paraffinic hydrocarbons or light oil as diluents is in very high demand. Considering the ultra-rapid expansion of the Canadian Oil Sands and the potential expansion of Venezuelan Orinoco Belt hydrocarbons, this will only improve the importance of novel crude oil transportation technologies for energy industry. Today, the viscosity reduction effect of existing products in the market cannot fully meet the requirements of heavy, extra-heavy and bituminous oil exploitation.

So it is highly significant to carry out research on viscosity reduction mechanisms and develop viscosity reducers that meet the requirement of thick oil exploitation, extraction and transportation.

The addition of two oxygenates; methyl-tert-butyl-ether (MTBE) and tert-amyl-methyl-ether (TAME) to reduce viscosity in heavy oils has been studied. Both MTBE and TAME are used as gasoline additives. It may be possible to add MTBE and TAME earlier in the production process in order to make use of their viscosity reducing and asphaltene precipitation prevention effects is now being studied. However, this does not solve the diluents transportation problem as both of these oxygenate products are produced at in the Gulf region and would require specialized pipelines for transport as well as reducing the oxidative resilience of crude oil.

There have also been a few attempts at using polymer-modified-bitumen (PMB) as a core technology platform for eliminating viscosity problem of the bitumen. However, results have been less than satisfying as polymers employed in the process interfere with most refinery chemical processes.

Accordingly, what is needed is a method of reducing viscosity in extra heavy crude oil (EHCO) production which yields savings by minimizing the consumption of diluent and increasing the oil production rate of heavy oil per day.

DISCLOSURE OF THE INVENTION

The disclosed invention relates to a viscosity reducer with active components based on vegetable extracts. The viscosity reducer composition comprises non-aromatic solvent, such as biodiesel; phospholipid, such as phosphoglyceride; vegetable oil; and polycyclic aromatic hydrocarbon.

The disclosed invention further relates to a method for treating a heavy and extra heavy crude oil to reduce viscosity by an amount in the range of from about 10% to about 60%, based on the initial viscosity of the hydrocarbon fluid, such as a hydrocarbon fluid having an initial viscosity of about 20000 cP measured at 25° C., and an American Petroleum Institute (API) gravity less than about 12.

The disclosed invention still further relates to a method for treating a heavy and extra heavy crude oil to reduce the consumption of diluents, such as naphtha or light crude oil, regularly used in heavy and extra-heavy crude oil production systems by an amount in the range of from about 5 to about 50%.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

Figure 1:
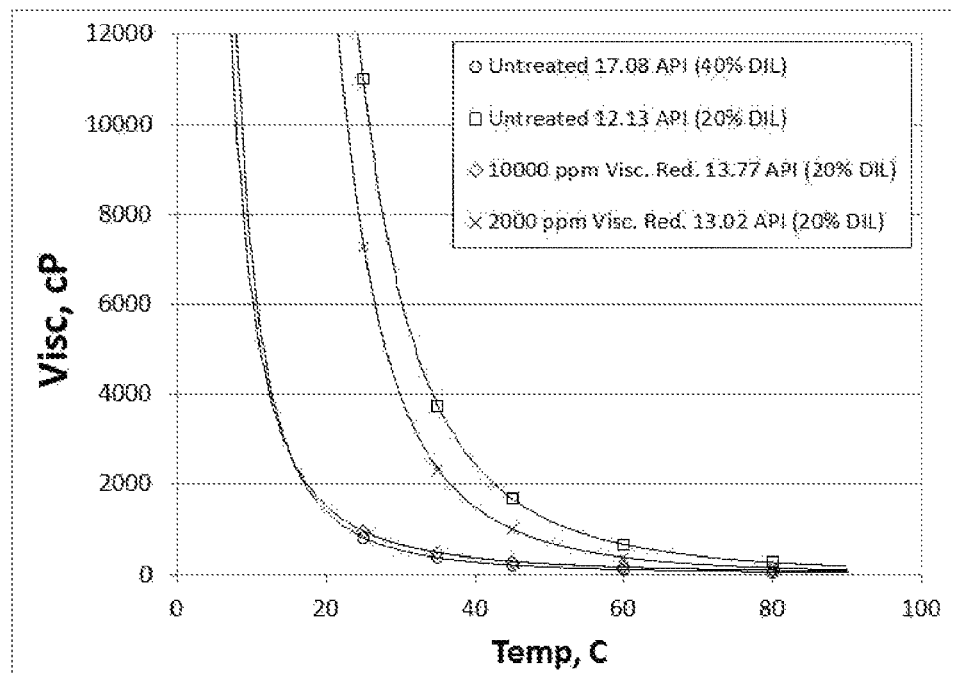
FIG. 1 shows the performance results of the viscosity reducer of Example 1

As discussed above, embodiments of the invention relate to a chemical treatment technology, applied to heavy and extra-heavy crude oil, to reduce viscosity and thereby enhance fluidity of the crude oil. The viscosity reducer of the disclosed invention is based on vegetable extracts and non-aromatic solvents with non-toxic and biodegradable components. The viscosity reducer composition comprises non-aromatic solvent, such as biodiesel; phospholipid, such as phosphoglyceride; vegetable oil; polycyclic aromatic hydrocarbon; and stabilizer.

The viscosity reducer of the invention does not rely on aromatic based solvents, such as toluene, xylene, INSOL 54 (58% V/V aromatic content, according to COVENIN Venezuelan Standard 2723) and/or INSOL 88 (95% V/V aromatic content, according to COVENIN Venezuelan Standard 2723). The viscosity reducer of the disclosed invention produces an effect on the rheology of the fluid by reduction of the intra-molecular interaction among asphaltene molecules, unlike conventional dilution methods, where a viscosity reduction is achieved by decreasing concentration of asphaltenes in the fluid.

Petroleum is a complex mixture of thousands of different hydrocarbons, which in a practical way can be classified as: saturates, aromatics, resins, and asphaltenes. Many of the current viscoelastic rheology and extreme viscosity models of heavy and extra-heavy crude oil, are currently explained by the presence and behavior of complex compounds, such as asphaltenes. Some models establish that asphaltene molecules exist as solid particles in colloidal suspension stabilized by resins adsorbed on their surfaces. Changes in temperature and pressure through the production system promote some resins to be desorbed from asphaltenes, thereby the asphaltene aggregate size increases and start precipitating. The main reason is that asphaltene is insoluble in the resin-free oil fraction which makes the precipitation or deposition an irreversible process.

The disclosed invention relates to a non-toxic and biodegradable chemical treatment technology, which enables a viscosity drop and changes in the rheology for heavy and extra-heavy crude oil, stabilizing asphaltenes by replacement of resins from the asphaltene-surface, and breaking the agglomerated state of asphaltenes.

The disclosed viscosity reducer, based on vegetable extracts of natural origin, does not need to be mixed with aromatic base solvents, such as xylene, toluene, INSOL 54, and/or INSOL 88, to enhance fluidity and reduce viscosity in heavy and extra heavy crude oils. The vegetable extract active component is attractive for oil field applications due to its biodegradable nature.

Suitable active components based on vegetable extracts include, but are not limited to mixtures of phosphoglyceride and vegetable oil. Generally, the amount of vegetable oil is in the range of from about 5 to about 15% by weight.

Generally the amount of phosphoglyceride is in an amount in the range of from about 5 to about 15% by weight.

Suitable non-aromatic solvents include, but are not limited to biodiesels, such as saturated and unsaturated fatty acid methyl esters and/or mixtures thereof. Generally, the amount of non-aromatic solvent in the viscosity reducer is in the range of about 60 to about 80% by weight.

Generally, the amount of polycyclic aromatic solvent is in an amount in the range of from about 5 to about 15% by weight.

Suitable stabilizers include, but are not limited to methanol, ethanol, isopropyl alcohol, butyl glycol, and/or mixtures thereof. Generally, the amount of stabilizer is in the range of from about 0.5 to about 2% by weight.

Generally, the crude oil is treated with the disclosed viscosity reducer at a concentration in the range of from about 500 ppm to about 30000 ppm. However, the concentration may vary at values higher or lower than those in the disclosed range, according to each specific crude oil to be treated, and the type of oil production systems, such as crude oil lift systems, transferring pumps, and oil dehydration equipment; and operating variables, such as temperature and pressure drops.

The method of making the disclosed viscosity reducer comprises mixing the non-aromatic solvent, such as biodiesel, in a blending vessel with the polycyclic aromatic hydrocarbon and the stabilizer at room temperature with constant high rate agitation. Once the biodiesel, polycyclic aromatic hydrocarbon and stabilizer are mixed to form a homogenized blend, the phospholipid, such as phosphoglyceride, is added at constant temperature with constant low rate agitation and mixed to again form a homogenized blend. The vegetable oil is then added to the homogenized blend while at room temperature and constant low rate agitation to form a viscosity reducer composition. The viscosity reducer composition is left resting for at least about 30 minutes before packaging if desired.

The disclosed viscosity reducer composition may be used to treat heavy or extra-heavy crude oil. The crude oil may be treated with or without the use of a diluent. The crude oil may be diluted with, for example, naphtha, medium crude oil, light crude oil and/or mixtures thereof. For example, the diluent can be 30 API gravity light crude oil. The heavy or extra-heavy crude oil may include both monophasic flows, wherein the liquid phase is comprised of hydrocarbons and water (brine), and multiphase (biphasic or three-phase) flows, which include the gas phase in addition to the same liquid phase.

Generally, the viscosity of heavy and extra-heavy crude oil is reduced by an amount in the range of from about 10% to about 60%, based on the initial viscosity prior to treatment with the disclosed viscosity reducer composition. A reduction of diluent in the range of about 3% to about 50% is achieved using the disclosed viscosity reducer. For example, extra heavy crude oil (EHCO) samples from the Orinoco Belt—Venezuela, have shown a viscosity drop of more than about 30%, using about 50% less diluent using the viscosity reducer composition of the disclosed invention at a concentration in the range of from about 2000 ppm to about 5000 ppm.

The viscosity reduction and/or diluent reduction is achieved by the direct injection of the disclosed viscosity reducer into the oil or hydrocarbon fluid to be treated, where the active components of the disclosed viscosity reducer disperse thoroughly into the oil or hydrocarbon fluid, with no usage of any aromatic based solvents, such as xylene, toluene, and/or INSOL. It is believed that asphaltene molecules in oils agglomerate to form micelle-like clusters. High molecular interactions between these clusters contribute towards the viscosity of the oils.

The viscosity reducer composition is injected downhole in crude oil wells. In one embodiment, the viscosity reducer composition may be injected through the usage of an injection quill installed in a pipeline, or before the suction side of a multiphase pump to transport the oil or hydrocarbon fluid from oil wells or oil well clusters, to petrochemical, chemical, petroleum and/or power facilities.

In another embodiment, the viscosity reducer composition may be injected via a capillary installed in an artificial lift pumping system, such as a progressing cavity pump (PCP), or an electrical submersible pump (ESP) for batching down or continuous backside injection. The disclosed viscosity reducer may also be injected into the crude oil at the wellhead of a sucker rod pump, and then recirculate this pre-treated fluid via the annulus between the drill collar and the borehole wall downhole. The disclosed viscosity reducer also may be introduced directly through the suction side of gear or reciprocating pumps to transfer slop oil from pits to treatment vessels, oil storage tanks, or other equipment generally used in a crude oil hydration system.

Example 1

EHCO (10.7 API gravity, Venezuelan Orinoco Belt) is treated with the disclosed viscosity reducer and the viscosity is measured using a rotational Brookfield-brand viscometer under the following parameters:
Temperature range: 25° C. to 80° C.;
Rotational Speed: 100 RPM;
Concentration: 2000 ppm and 10,000 ppm;
Diluent: Light Crude Oil (Blend: Santa Barbara/Dacion); and
% Diluent: 20 and 40.

The viscosity reducer is added at room temperature into the diluted EHCO, in the above concentration range, with % diluent of 20 and 40. After shaking the treated EHCO, a suitable amount is poured into the viscometer container. The treated EHCO is heated until the desired temperature is reached and the viscosity measurements are made. The results achieved under different temperatures show the thermic-viscosity profile for each concentration.

FIG. 1 shows the performance of the viscosity reducer of Example 1. The original viscosity profile (sample not treated) curve is represented by 40% diluent and 17.08 API gravity. Once the percentage of diluent is reduced 50% from the original condition, the viscosity profile increases significantly, which is represented by the curve 20% diluent and 12.13 API gravity. Then, when the same sample with 20% diluent is treated with the disclosed viscosity reducer at 2000 ppm, the viscosity profile descends between 35% and 50% within the temperature range of 25° C. to 60° C. (see curve 2000 ppm viscosity reducer 13.02 API). On the other hand, as can be seen in FIG. 1, it is important to emphasize the disclosed viscosity reducer at a dose of 10,000 ppm in the 20% diluted sample (see curve 10,000 ppm viscosity reducer and 13.77 API gravity), is able to affect the viscosity upward to yield a thermic viscosity profile that overlaps the initial thermic viscosity profile. Using the disclosed viscosity reducer results in a change in the fluid rheology, since 10,000 ppm yields a viscosity profile similar to the untreated viscosity profile, minimizing by 50% the diluent usage.

Example 2

EHCO (7.7 API gravity, Junin Sur field-Venezuelan Orinoco Belt), is treated following the procedure as set forth in Example 1 using the disclosed viscosity reducer, under the following parameters:
Temperature range: 25° C. to 80° C.;
Rotational Speed: 100 RPM;
Concentration: 5000 ppm;
Diluent: Naphtha; and
% Diluent: 10 and 20.

Figure 2:
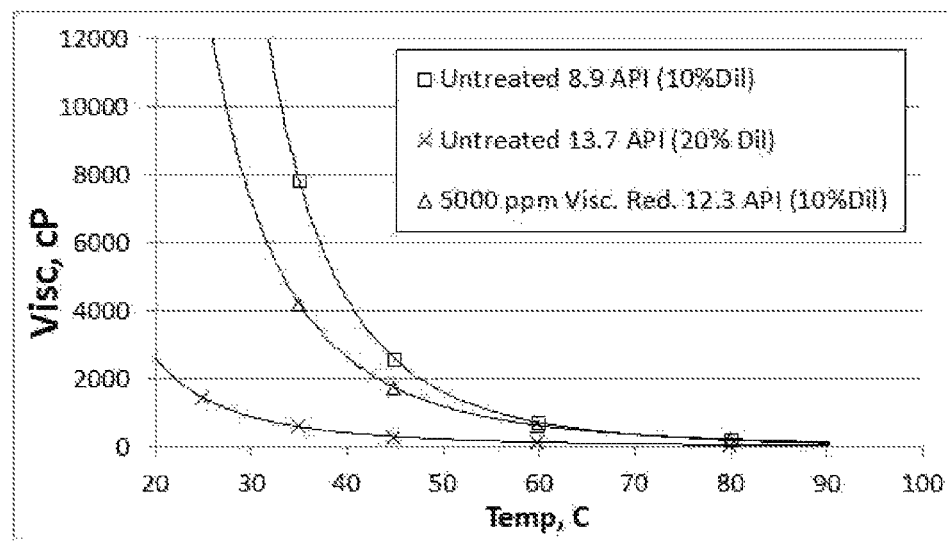
FIG. 2 shows the performance results of the viscosity reducer of Example 2.

FIG. 2 shows the performance of the viscosity reducer in EHCO from Junin Sur. In FIG. 2, the initial viscosity is represented by the blend with 20% diluent and 13.7 API gravity. FIG. 2 shows an important viscosity increment, once the diluent percentage goes down from 20% to 10%. At 5000 ppm of the viscosity reducer in the EHCO diluted at 10%, changes in viscosity are achieved. With 50% less diluent and an API gravity of 8.9, viscosity is satisfactorily reduced 40-50%, based on the untreated sample.

Example 3

EHCO (7.7 API gravity, Junin Sur field-Venezuelan Orinoco Belt), is treated using the disclosed viscosity reducer following the procedure as set forth in Example 1, under the following parameters:
Temperature range: 25° C. to 80° C.;
Rotational Speed: 100 RPM;
Concentration: 2000 and 5000 ppm;
No Diluent; and
Initial Viscosity 675000 cP at 25° C.

Figure 3:
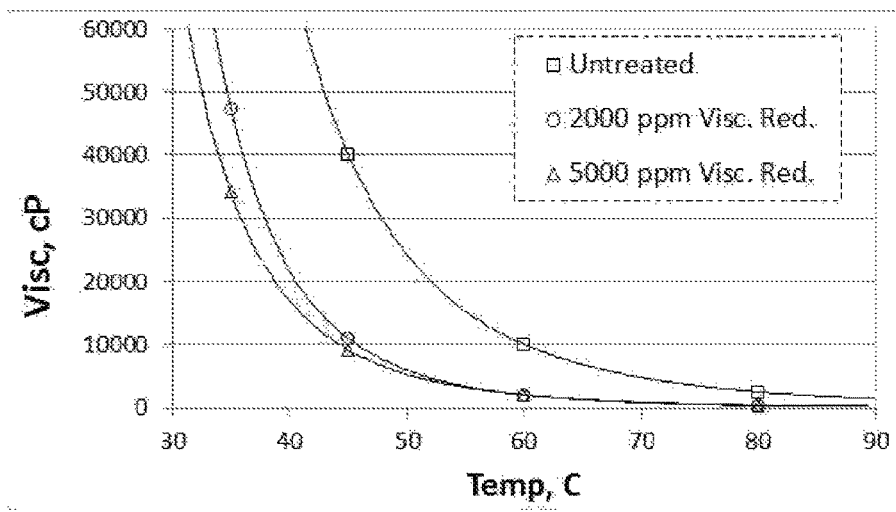
FIG. 3 shows the performance results of the viscosity reducer of Example 3.

FIG. 3 shows the performance of the viscosity reducer in EHCO from Junin Sur, without diluent. The use of the viscosity reducer results in a viscosity reduction of about 60% as compared to the initial viscosity of 675000 cP at 25° C.

Example 4

The viscosity of a crude oil (8 API gravity, in the Topoyaco Field in Colombia) is measured under standard ASTM D341, using the viscometer as described in Example 1 above, with temperatures within 40° C.-80° C., and a concentration of the disclosed viscosity reducer of 30,000 ppm.

Figure 4:
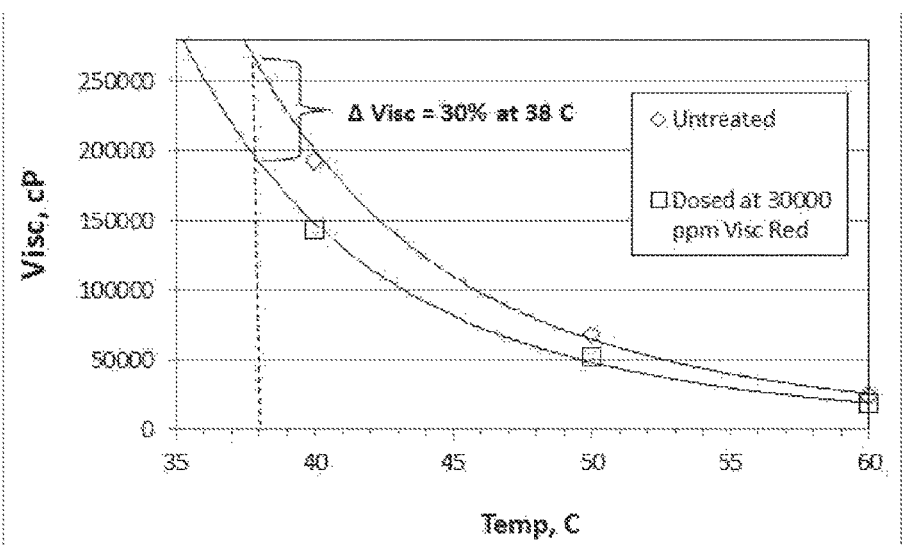
FIG. 4 shows the performance results of the viscosity reducer of Example 4.

FIG. 4 shows performance of the viscosity reducer at 30,000 ppm in extra heavy oil from Topoyaco (Colombia). As can be seen in FIG. 4, a viscosity reduction of 30% is achieved by the application of 30000 PPM of the viscosity reducer, with no usage of any diluent.

Example 5

Oliensis spot tests (OST) are performed on heavy crude oil from the Tiguaje field (North West Venezuela) under the standard AASHTO T-102-42, using different concentrations from 200 ppm to 50,000 ppm of the viscosity reducer as disclosed in the invention.

Figure 5:
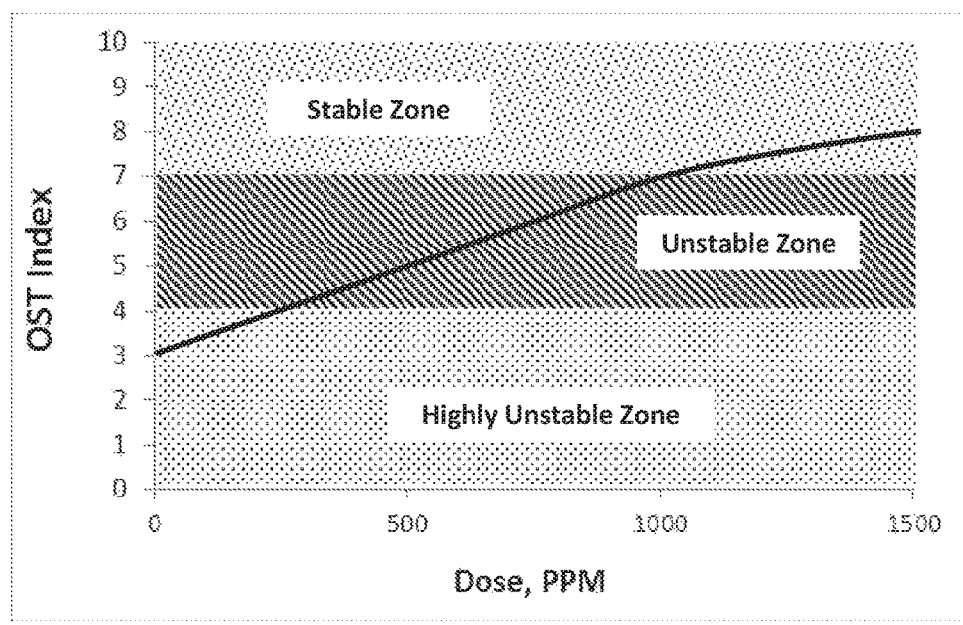
FIG. 5 shows the performance results of the viscosity reducer of Example 5.

As can be seen in FIG. 5, the results show the viscosity reducer has an excellent dispersive effect in asphaltenes. At a concentration of 1500 ppm, treatment with the viscosity reducer is able to switch the original unstable state of the asphaltenes from the unstable zone, with a OST index lower than 7, to a stable zone with an index equal to 8, where the asphaltene flocculation is highly minimized.

The embodiments and examples set forth herein were presented in order to best explain the disclosed invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A viscosity reducer composition for hydrocarbon fluid, the viscosity reducer composition consisting essentially of phosphoglyceride, vegetable oil, non-aromatic solvent, polycyclic aromatic hydrocarbon and stabilizer, wherein the amount of stabilizer is in the range of from about 0.5 to about 2% by weight, and wherein the polycyclic aromatic hydrocarbon is in the range of from about 5 to about 15% by weight.

2. The viscosity reducer composition of claim 1, wherein the vegetable oil is in an amount in the range of from about 5 to about 15% by weight.

3. The viscosity reducer composition of claim 1, wherein the phosphoglyceride is in an amount in the range of from about 5 to about 15% by weight.

4. The viscosity reducer composition of claim 1, wherein the non-aromatic solvent is a biodiesel.

5. The viscosity reducer composition of claim 4, wherein the biodiesel is selected from the group consisting of saturated fatty acid methyl esters, unsaturated fatty acid methyl esters and/or mixtures thereof.

6. The viscosity reducer of claim 1, wherein the non-aromatic solvent is in an amount in the range of from about 60 to about 80% by weight.

7. The viscosity reducer composition of claim 1, wherein the stabilizer is selected from the group consisting of methanol, ethanol, isopropyl alcohol, butyl glycol, and/or mixtures thereof.

8. The viscosity reducer composition of claim 1, wherein the hydrocarbon fluid is heavy or extra heavy crude oil having an API in the range of about 7 to about 22.

* * * * *